Dec. 1, 1953 E. V. HARDWAY, JR 2,661,430
ELECTROKINETIC MEASURING INSTRUMENT
Filed Nov. 27, 1951 5 Sheets-Sheet 1

*INVENTOR.*
EDWARD V. HARDWAY, JR.
BY
*Stone, Boyden & Mack*
ATTORNEYS

Dec. 1, 1953  E. V. HARDWAY, JR  2,661,430
ELECTROKINETIC MEASURING INSTRUMENT
Filed Nov. 27, 1951  5 Sheets-Sheet 2
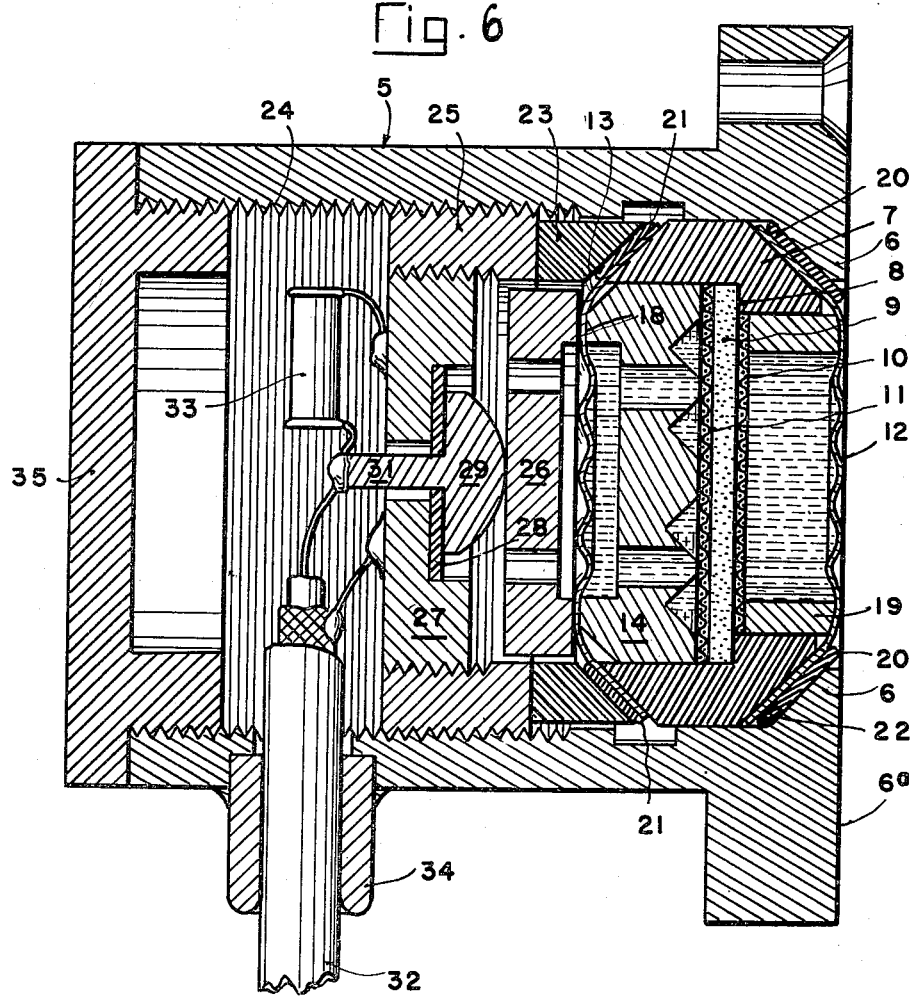
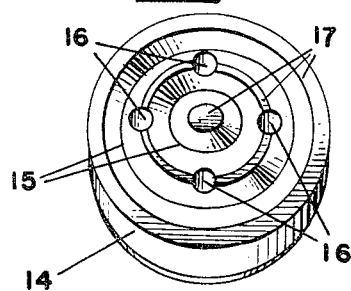
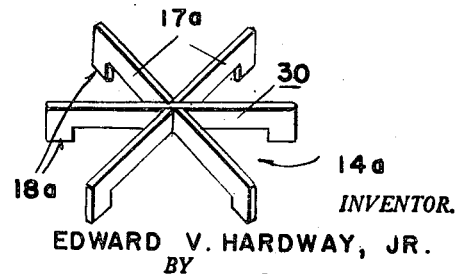
INVENTOR.
EDWARD V. HARDWAY, JR.
BY
Stone, Boyden & Mack
ATTORNEYS Dec. 1, 1953    E. V. HARDWAY, JR    2,661,430
ELECTROKINETIC MEASURING INSTRUMENT
Filed Nov. 27, 1951    5 Sheets-Sheet 3

*INVENTOR.*
EDWARD V. HARDWAY, JR.
BY
Stone, Boyden & Mack
ATTORNEYS

Dec. 1, 1953 E. V. HARDWAY, JR 2,661,430
ELECTROKINETIC MEASURING INSTRUMENT
Filed Nov. 27, 1951 5 Sheets-Sheet 4

INVENTOR.
EDWARD V. HARDWAY, JR.
BY
Stone, Boyden & Mack.
ATTORNEYS

Patented Dec. 1, 1953

2,661,430

UNITED STATES PATENT OFFICE 2,661,430

ELECTROKINETIC MEASURING INSTRUMENT

Edward V. Hardway, Jr., Richmond, Va.

Application November 27, 1951, Serial No. 258,493

29 Claims. (Cl. 310—2)

This invention relates to apparatus for the accurate measurement of physical variables such as pressure or acceleration by utilizing an electrokinetic transducing means to convert the physical variable to a measurable voltage or current.

A review of the history of the discoveries of various electrokinetic phenomena is given in "Electrokinetic Phenomena," H. A. Abramson, Chemical Catalog Publishing Company, 1934. A few of these discoveries are mentioned here to show the prior art. Ruess, in 1908, discovered the phenomenon of "electro-osmosis," that is that certain liquids will flow through porous solids when subjected to an electric field. He conducted experiments with a U-tube apparatus with a quartz powder plug in the bottom of the U-tube and with platinum electrodes on each side of the plug. When water was placed in the U-tube and the electrodes connected to a voltaic pile, the water level in one of the two U-tube arms would rise in opposition to the proportional restoring force of gravity and fall again when the electromotive force was removed.

Quinke, in 1859, discovered the phenomenon converse to electro-osmosis, that is, "streaming potential." He found that various liquids, when forced under pressure through a porous plug, caused a potential to develop across the plug, as measured across electrodes located on each side of the plug. He further discovered that the voltage produced was independent of the size and length of the plug, but was proportional to the applied pressure. Theories relating to electrokinetic phenomena were more fully developed through the years, particularly by investigators in the field of biochemistry. Studies of electrokinetic phenomena at high alternating frequencies were made in connection with the determination of surface conductance. See J. J. Bickerman, Z. physik Chem., A, 163, 378; 1933. Williams in the "Review of Scientific Instruments," vol. 19, No. 10, 640–646 describes experiments with an electrokinetic transducer in the measurement of varying and transient pressures.

It is thus seen that the phenomena upon which the present invention is based have long been recognized. However, to my knowledge, the art has been unable to produce a commercially satisfactory electrokinetic transducer, and it is accordingly the general object of my invention to provide such a transducer and electrokinetic instruments employing the same.

A commercially marketable measuring instrument must have a constant sensitivity substantially unaffected by time or ambient temperature. The most important single difficulty encountered in producing a satisfactory electrokinetic instrument is that of contamination of the electrokinetic liquid. Such materials as acrylate plastics, rubber, synthetic rubbers and many other common materials cannot be used internally in contact with the most desirable instrument liquids, since such materials contain acids, plasticizers and anti-oxidants which slowly go into solution, resulting in a gradual decay in sensitivity caused by increasing conductivity. The same difficulty is encountered where the liquid is exposed to the atmosphere because of the absorbtion of carbon dioxide and other impurities.

Thus, serious restrictions on the use of electrokinetic transducers are imposed by the non-suitability of most available construction materials and by the difficulty involved in obtaining a structure in which the electrokinetic liquid does not automatically become contaminated through air contact. It is these restrictions which have heretofore been primarily responsible for the failure of electrokinetic instruments to give satisfactory operation from the standpoint of repeatability, reliability and insensibility to ambient variables.

On the other hand, there are inherent and important advantages in electrokinetic measuring instruments over existing types for the measurement of pressure and acceleration over a wide range of frequencies because of their self generating characteristics and freedom from resonant or "natural frequency" effects. With electrokinetic instruments, it is possible to achieve voltage and power sensitivities several orders of magnitude greater than with conventional strain gage instruments, and to measure accurately at frequencies from ten to one hundred times higher than with strain gage instruments. The voltage sensitivity of electrokinetic instruments is several orders of magnitude greater than that of conventional piezoelectric devices designed to cover the same range of frequencies. The applications may include standard microphones, hydrophones, seismographic pickups, vibration pickups, phonograph pickups, physiological instruments, and others in addition to those hereinafter described.

An object of the present invention is to provide apparatus with high sensitivity suitable for measuring alternating and transient gage or differential pressures accurately and reliably, at sub-sonic, sonic and ultra-sonic frequencies and at all normally encountered atmospheric ambient temperatures.

Another object of the present invention is to provide high sensitivity electrokinetic measuring apparatus suitable for reliable and accurate measurement of transient and shock wave pressures in gases or liquids over a wide range of ambient temperatures, with minimum acoustical disturbances arising from the shape and design of the instrument, and without destruction of the instrument's porous plug when pressures exceed those which normally would cause breakage of the porous plug supported at the edges.

Another object of the present invention is to provide high sensitivity electrokinetic measuring apparatus for the reliable and accurate determination of acceleration reaction pressures from which the acceleration of the case of the apparatus can be readily determined over a wide range of frequencies and amplitudes at any normal atmospheric ambient temperature.

These and other objects of my invention are accomplished by the novel apparatus hereinafter described. In order that this apparatus may be understood in detail, reference is made to the accompanying drawings which form a part of this specification, and wherein:

Fig. 6 is an axial sectional view of an electrokinetic pressure measuring instrument constructed in accordince with the invention and particularly suited for measuring shock wave pressure;

Figs. 6b and 6c show two modifications of the disk backing member;

Figure 1:
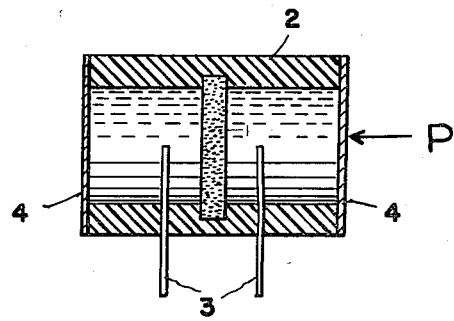
Fig. 1 is an axial sectional view of a simple electrokinetic cell.
Figure 1A:
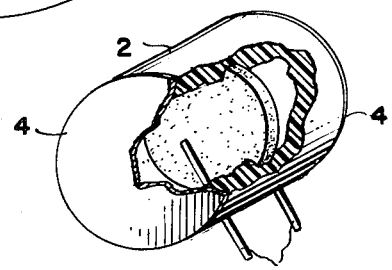
Fig. 1a is an oblique view of the cell of Fig. 1, a part of the enclosure thereof being broken away to show the interior of the cell.

The primary elements of an electrokinetic cell, hereinafter referred to as an "EK cell," are shown in Figs. 1 and 1a. This arrangement is not considered as a satisfactory cell as shown but is given for purely illustrative purposes in connection with the development of the dynamical principles of operation.

A porous plug 1, preferably of ultra-fine porosity fritted Pyrex glass, is sealed into an outer insulating ring 2, preferably of polytetrafluoroethylene resin. Metal diaphragms 4 on each side are sealed to outer irng 2 by suitable sealing means between the diaphragms and outer ring 2 thus forming an enclosure. Pins 3, preferably of aluminum, are pressed into outer ring 2 after filling with an electrokinetic liquid and form electrodes in the liquid chambers on each side of the porous plug. The electrokinetic liquid is preferably acetonitrile or any liquid with suitable electrokinetic properties.

When a pressure, P, is applied to one diaphragm of the EK cell in Fig. 1, the electrokinetic liquid flows from one chamber to the other, through the porous plug 1, which may be considered as a bundle of small capillary tubes. When the liquid molecules are electro-statically unbalanced, having finite dipole moments, they assume preferred orientations at the interface between the liquid and the porous plug 1 surfaces. The liquid in the center region of the small capillaries thus becomes oppositely charged from the liquid layer at the interface. When the liquid moves under an applied pressure, a volume current of charged liquid flows through the plug 1 and a potential difference is developed across the plug 1. A countercurrent is present because of the liquid's conductivity, which limits the potential to a definite value proportional to the applied pressure.

The potential developed across either a single capillary or a porous plug is independent of porosity, plug diameter and length, and is given approximately by the well-known relationship $$\frac{H}{P} = \frac{Ze}{4\pi nK}$$

where:

H is the open circuit voltage across the electrodes,
Z is the zeta potential at the solid liquid interface,
n is the viscosity,
K is the effective conductivity,
P is the pressure across the plug, and
e is the dielectric constant of the liquid.

Inasmuch as conductivity is affected appreciably by small amounts of impurities and it is impractical, if not impossible, to obtain absolutely pure liquids, it is not possible to state exact figures for the ratio of H/P for different material combinations which may be readily repeated experimentally. It is possible, however, to give approximate values and to construct cells which, through careful sealing and the proper choices of materials, will have fixed and known sensitivities for an indefinite period at the same temperatures. I have discovered that when 50 percent mixture of methyl alcohol and diethyl ketone is streamed through a fritted glass porous plug, the sensitivity H/P increases approximately 30% from 0° C. to 50° C. The conductivity increases with temperature but not sufficiently to make the $nK$ product a constant. Over the same range the product $Ze$ remains substantially constant. The sensitivity $H/P$ also increases with temperature when acetonitrile is streamed through a porous plug, the conductivity increasing and the viscosity decreasing with temperature. It is evident, therefore, that means must be incorporated to compensate the apparatus for ambient temperature if accurate measurements are to be achieved without the independent determination of temperature and the computation of temperature corrections when the apparatus is in use.

The feature which facilitates the achievement of unusual performance characteristics is the independence of sensitivity to reduced permeability over a wide range of pore sizes in the porous plug. Plugs with pore sizes less than four microns may be used. Such plugs have extremely low permeability, insuring a small Reynold's Number, a linear relationship between pressure and velocity and extremely high damping. The damping forces are so large that the diaphragms' elastic force and the inertial force due to the acceleration of the liquid may be neglected except at very low or very high frequencies. For very small pore diameters, the size being dependent on the materials used, the streaming potential sensitivity $H/P$ will decrease with pore diameter as a result of the increasing effects of electro-osmotic back pressure, surface conductance, and other effects at the boundary layer not fully understood. A decrease of from 1.1 volts per p. s. i. to .200 millivolts per p. s. i. has been noted when using an acetonitrile sample at 25° C. and changing from 5 micron pore diameter plug to a 1.2 micron pore diameter plug. In many applications the decreased sensitivity will not be significant but the increased frequency response afforded by very low permeability is of great importance to the utility of the instrument. A useful range of measurement of from, say, 0.1 cycle per second to 100,000 cycles per second can be achieved by the proper selection of design parameters.

The physical explanation of the factors which control dynamic performance may be readily explained by reference to Fig. 2 which is the analogous or equivalent electrical circuit of the EK cell in Fig. 1. It is first necessary to write the basic electrokinetic steady state equations for a porous plug which are based on an extension of currently published theory and which satisfy the conservation of energy relationships for such a system.

$$I = \frac{2ZeN}{F}V + \frac{KAF}{t}H$$

$$P = \frac{2ZeN}{F}H + \frac{8\pi n t N}{AF^2}V$$

In the above equation $I$ is the current flowing to and from the electrodes in an external circuit. $N$ is the effective number of pores per unit area, $F$ is the effective ratio of pore area to unit area, $A$ is the plug area, $V$ is the volume rate of flow, and $t$ is the plug thickness. Since $F$ and $N$ would normally be "effective" experimentally determined parameters, the theoretical discrepancies, in assuming round parallel capillaries, cause no harm.

The left hand term in the first equation is the electrokinetic current caused by the motion of the charged liquid. The second term is the reverse conductivity current which is equal to the electrokinetic current when no current flows in an external circuit. In the second equation, the first term is the electrokinetic back pressure (similar mechanically to electrical "back E. M. F."). The second term accounts for the viscous resistance pressure. For a given plug material the effective values of $F$ and $N$ can be readily determined experimentally. If the equations are solved for the streaming potential sensitivity with no external flow of current, or $I=0$, and if the electrokinetic back pressure is neglected in comparison with the viscous term, the well known equation $$\frac{H}{P} = \frac{Ze}{4\pi nK}$$

is obtained. The relations controlling electro-osmosis and other phenomena can also be obtained by similar methods.

Figure 2:
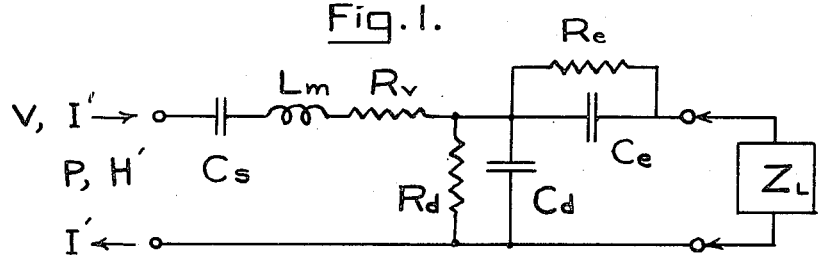
Fig. 2 is a circuit diagram in which mechanical elements of the electrokinetic cell of Fig. 1 are represented by analogous electrical components.

To develop the equivalent circuit for varying pressure in Fig. 2, from the above equations several new terms are defined:

$M = \frac{2ZeN}{F}$ the electromechanical coupling constant, $H' = P/M$ the voltage equivalent of pressure, $I' = MV$ the electric current equivalent of volume rate of flow, $R_v = \frac{8\pi n t N}{AF^2M^2}$ the electrical equivalent of viscous flow resistance, $L_m = \frac{m}{A^2}\frac{1}{M^2}$ the inductance equivalent of the fluid mass $m$, $C_s = SM^2$ the capacitance equivalent of the elastance of the two diaphragms $S$, $R_d = t/KAF$ the effective plug resistance, $C_d$ is the capacitance of the plug across the two flat parallel surfaces, $R_e$ is the series resistance from the electrodes to the plug faces, $C_e$ is the series capacitance from the electrodes to the plug faces, and $Z_L$ is load impedance of any external circuit connected to the electrodes.

When $Z_L$ is drawing current in Fig. 2, and particularly if $Z_L$ includes an appreciable cable capacity, it will be obvious that the electrode resistance must be minimized to reduce serious attenuation effects at high frequencies. I have found that the use of pin or wire electrodes 3, Fig. 1, is highly undesirable and inefficient because of the high output impedance resulting from their small surface area and distance from the porous plug. The series electrode resistance $R_e$ can readily amount to several hundred thousand ohms in actual designs. For example, if a fifty foot 20 mmf. per foot cable were used and the value of $R_e$ were 500,000 ohms, an error of 5% would then be caused at a frequency of only 100 cycles per second. It is thus extremely important that electrodes be used that are in intimate contact with, or in close proximity to, the porous plug surface. If the electrodes be so arranged, as hereinafter described, the resistance $R_e$ may be neglected or considered zero. The dynamical differential equations may then be written $$I = I' + \frac{H}{R_d} + C_d\frac{dH}{dt}$$

$$H' = H + R_v I' + L_m\frac{dI'}{dt} + \frac{1}{C_s}\int I' dt$$

and the combined dynamic response equation for sinusoidally alternating pressures at an angular frequency W may be written as $$\frac{H}{P} = \frac{1}{M} \frac{R_d}{R_v} \frac{1}{\sqrt{\left[\frac{R_d}{R_v}+1+\frac{T_e}{T_s}-W^2 T_m T_e\right]^2 + \left[WT_e + WT_m + \frac{1}{WT_s}\right]^2}}$$

where $T_e = R_d C_d$ the electrical time constant,
$T_s = R_v C_s$ the elastance time constant, and
$T_m = L_m/R_v$ the mass time constant.

For simplification, the equations may now be considered separately at low, mid-band, and high frequencies. The analogous circuits are shown in Figs. 3–5.

Figures 4, 5:
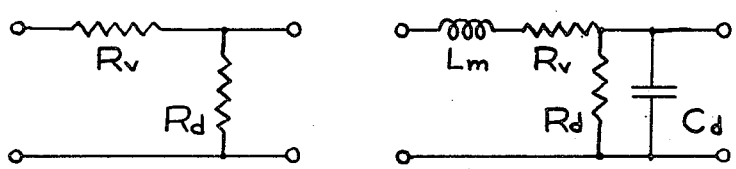
Fig. 4 is a circuit diagram similar to Fig. 3 showing the components effective at mid-band frequencies.
Fig. 5 is a circuit diagram similar to Fig. 3 showing the components effective at high frequencies.

For mid-band frequencies, Fig. 4, the equation is $$\left(\frac{H}{P}\right)_{mid} = \frac{1}{M} \frac{R_d}{R_v} = \frac{Ze}{4\pi nK} \text{ and } R_v \gg R_d$$

Figure 3:
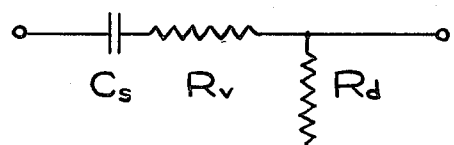
Fig. 3 is a circuit diagram similar to Fig. 2 but for a cell with negligible electrode impedance, showing the components effective at low frequencies.

For low frequencies, Fig. 3, the equation is $$\left(\frac{H}{P}\right)_{low} = \left(\frac{H}{P}\right)_{mid} \sqrt{1 + \frac{1}{W^2 T_s^2}}$$

For high frequencies, Fig. 5, the equation is $$\left(\frac{H}{P}\right)_{high} = \left(\frac{H}{P}\right)_{mid} \frac{1}{\sqrt{[1+W^2 T_m T_e]^2 + [WT_e + WT_m]^2}}$$

The equation at high frequencies in complex form becomes $$\left(\frac{H}{P}\right)_{high} = \left(\frac{H}{P}\right)_{mid} \frac{1}{(1+jWT_m)(1+jWT_e)}$$

The small percentage errors produced electrically and mechanically are thus additive. The method of application of the above equations to the design of practical instrument will vary with the application. It can be seen that the equations, together with the circuits in Figs. 2–5, as well as the structures hereinafter described, apply to sonic or ultra-sonic generators as well as to measuring instruments if a power source is substituted for the load and the equivalent acoustic impedance is connected across the input terminals.

The important mechanical relationships which control the limits of an instruments frequency response are restated and simplified here as they are important in the design and arrangements incorporated in my invention. It is assumed for these relations that a 5% error is the maximum that can be tolerated at the upper and lower frequency limits of measurement.

The errors due to the presence of the electrical time constant $T_e$ are neglected and $T_e$ is assumed to be zero.

The upper angular frequency will be designated as $W_2$ and the lower as $W_1$. It can readily be established from the equations given above that for errors less than 5%

$$W_2 T_m \leq \frac{1}{3}$$

$$W_1 T_s \geq 3$$

The time constants $T_s$ and $T_m$ can be re-written as $$T_m = \frac{hl}{c}$$

$$T_s = \frac{c}{k}$$

Where $h$ is the fluid density, $l$ the effective total length of the fluid column, $c$ is damping coefficient or pressure per unit velocity, and $k$ is the elastic coefficient of the two diaphragms in parallel or pressure per unit displacement or reciprocal elastance.

From the above it may be seen that the ratio of limiting frequencies is the same as that for the time parameters or $$\frac{W_2}{W_1} = \frac{T_s}{T_m}$$

The damping ratio $C/C_c$ where $C_c$ is the value of damping for response borderline between aperiodic and periodic response is given by $$\frac{C}{C_c} = \frac{1}{2} \sqrt{\frac{T_s}{T_m}}$$

I have found that, if the porous plug is a fritted glass disc 1.5 mm. in thickness and with an average pore size of 1.2 microns, the electrokinetic liquid is a ½" column of acetonitrile at 25° C., and the chambers of the cell are each closed by a diaphragm with a stiffness of 8,400 pounds per square inch per inch, the mechanical error limitations allow a frequency range of from approximately 90 c. p. s. to 900,000 c. p. s., or a range of 1 to 10,000. Such a range would be useful in special underwater hydrophones. The requirement here is that $$\frac{T_s}{T_m} \geq 10,000$$

or that the damping ratio $C/C_c$ be greater than 50. Much more flexible diaphragms can of course be used to extend the low frequency range in air and longer liquid columns may be used at low ultrasonic frequencies provided that the internal distance from the diaphragm to the disc be preferably less than ¼ the wave length of sound at the upper frequency to prevent reinforcement. The advantages of a high damping ratio preferably above 50 are evident. The attainment of such parameters is novel and highly advantageous in electrokinetic apparatus.

In commercially acceptable instruments such as pressure pickups or accelerometers, it is essential that the sensitivity be reasonably independent of temperature over their operating range. In an electrokinetic instrument, both the sensitivity and the effective output resistance $R_d$ is a function of temperature. The sensitivity increases with the temperature of the instrument. By measuring the instrument sensitivity and output resistance at various points over the temperature range, it is possible to then compute data for a family of curves of compensating shunt resistance versus temperature at a different sensitivity for each curve. I have found that by using manufacturers' data curves on negative temperature co-efficient resistors, so-called NTC resistors or thermistors, it is possible by trial and error to select suitable thermistors alone, in shunt, or in series shunt combinations with fixed resistors, which, when located inside the instrument case and connected between the electrodes, will produce an overall instrument sensitivity substantially independent of ambient and instrument temperature over a wide range. The use of negative temperature coefficient resistors in shunt compensating circuits in combination with the electrokinetic apparatus described herein, is a novel and effective method of overcoming inaccuracies associated with temperature variations.

Hereafter, when an "NTC resistor" is referred to, the circuit is understood to include either parallel or fixed resistors of other types to obtain the desired overall negative temperature coefficient. It will from the above be evident to those skilled in the art that when the electrokinetic instrument is used to actuate a very low resistance device such as a galvanometer that an additional series resistance must be used in the galvanometer circuit and that the negative characteristic of the shunt circuit will have to be substantially greater.

Figure 6A:
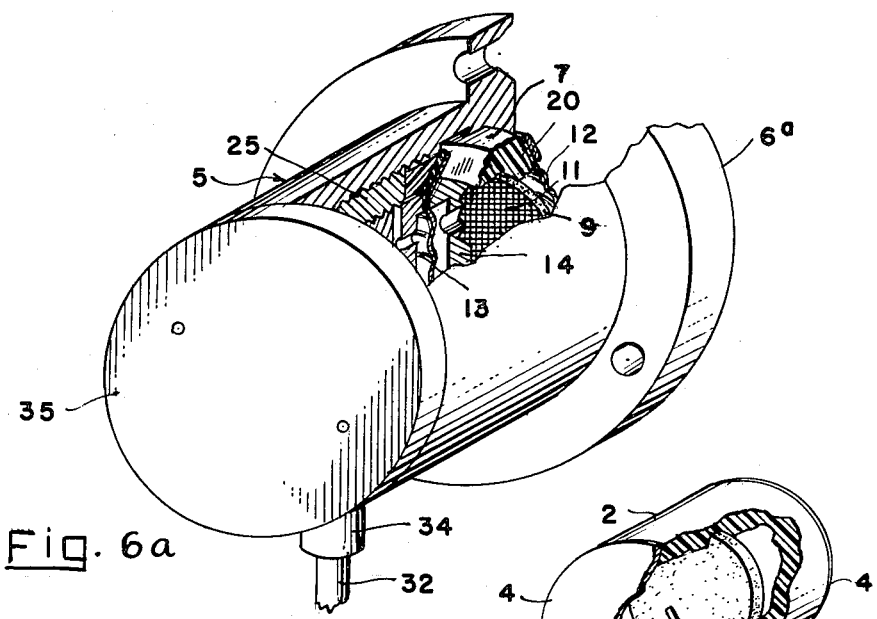
Fig. 6a is an oblique view of the instrument of Fig. 6, parts being broken away to show the interior of the instrument.

Fig. 6 is an axial cross-sectional view of a pressure transducer particularly suitable for baffle mounting and for the measurement of shock waves or explosion effects in open air. By the introduction of hermetically sealed joints it may be used also for underwater sonic or ultra-sonic measurements. For shock wave air measurements it is often necessary to have the diaphragm flush with the front face of the instrument, and further, to provide means of preventing breakage of the porous plug when the transient pressures exceed those which the porous plug can withstand supported at the edges. It is evident that by adding additional adapters or by merely modifying the housing thereof, the apparatus can be used in measuring pressures in pipes or for other applications.

The electrokinetic instrument shown in Fig. 6 comprises a housing 5 having at one end a transverse internal annular tapered flange 6. The housing 5 is of electrical conducting material and is generally tubular, so that the flange or shoulder 6 is located at one end of a tubular bore as shown.

Disposed within the housing adjacent the flange is an electrokinetic cell comprising an insulating enclosing ring 7 having a transverse internal shoulder 8. The ring 7 is preferably formed of polytetrafluoroethylene (Teflon), and has its ends tapered at an angle such that the end face of the ring adjacent the flange 6 is generally parallel thereto. Seated against the shoulder 8 is a porous plug 9, preferably in the form of a disc of microporous fritted glass having a thickness of 1.5 mm. or less. The electrodes of the cell are in the form of permeable conductive sheets 10 and 11 each overlying one face of the plug 9. Preferably, the electrodes overlie substantially the entire exposed faces of the plug, as shown, so that the plug faces and the electrodes are substantially coextensive. The electrodes 10 and 11 are preferably of fine mesh aluminum wire cloth.

The plug 9 divides the interior of the ring 7 into two chambers, so that the electrode 10 lies in one chamber and the electrode 11 in the other. The two chambers are filled with a suitable electrokinetic liquid, preferably acetonitrile. Electrically conductive diaphragms 12 and 13 are disposed across the ends of the ring 7 to seal the chambers. In the chamber on the side of the cell opposite the shoulder 6 there is disposed an electrically conductive plug backing member 14, the purpose of which is to provide a backing support for the porous plug 9 as will hereinafter appear. As best seen in Fig. 6b, the backing member 14 may be in the form of a disc having two concentric V-grooves 15 in one face thereof, and a plurality of longitudinal bores 16 extending from face to face. Thus, because of the V-grooves 15, the backing member has one face, for contact with the electrode 11, which is an interrupted planar supporting face 17, so that when the backing member is in place in the cell with said interrupted planar supporting face in contact with the electrode 11, there can still be free movement of liquid from the plug 9, through the electrode 11, the V-grooves 15 and the bores 16. As seen in Fig. 6 the rear face 18 of the backing member 14 is annular, engaging the diaphragm 13 adjacent the ring 7 only, and leaving the central or working area of the diaphragm free to flex. The backing member 14 thus mechanically connects the diaphragm 13 and the plug 9 through the electrode 11, yet provides for free flow of liquid in the cell and for free operation of the diaphragm 13.

On the opposite side of the plug 9, the electrode 10 is held in place by an annular ring 19 contacting both the electrode 10 and the diaphragm 12. Both the backing member 14 and the ring 19 are of electrically conductive material, preferably aluminum. Thus, the diaphragms 12 and 13 form the contacts for the cell, being electrically connected to the electrodes 10 and 11, respectively.

Elastic annular gaskets 20 and 21, preferably of a rubber compound with good compressive set properties, are located one at each end of the cell overlying the peripheral portions of the diaphragms 12 and 13. The gasket 20 lies between the cell and the flange 6, and is provided with an electrically conductive element 22 to provide a connection between the diaphragm 12 and the housing 5. Positioned against the gasket 21 is a pressure ring 23, preferably of polytetrafluoroethylene, having a tapered sealing face parallel to the adjacent end face of the ring 7. The housing 5 is interiorly threaded at 24, and a pressure applying member 25 is disposed within the housing, the member 25 having exterior threads engaging the interior threads of the housing. The pressure ring 23 is positioned between the member 25 and the cell, so that rotation of the member 25 in one direction forces the ring 23 against the cell, causing the ring to seat against the diaphragm 13 and the gasket 20 to seat against the shoulder 6, with diaphragm 12 substantially flush with end face 6a of the housing 5.

Situated within the housing 5 and in contact with the diaphragm 13 opposite the rear face 18 of the backing member 14 is a pressure plate 26 of electrically conductive material. The member 25 is provided with a central interiorly threaded bore, and an exteriorly threaded pressure applying member 27 is threaded into said bore. Centered in the member 27, but electrically insulated therefrom by an insulating washer 28 is a contact member 29 having a generally spheroidal contact surface engaging the pressure plate 26. Thus, rotation of the member 27 in one direction relative to the member 25 urges the contact member 29 against the pressure plate 26, thereby affording backing support for the backing member 14 through the diaphragm 13. By this means, I am able to rigidly locate the porous plug 9 relative to the housing 5, the interrupted planar face 17 of the backing member 14 providing uniform support for the plug, so that violent pressure waves cannot rupture the plug. Yet motion imparted to the diaphragm 12 by the physical variable being measured operates upon the liquid of the cell, and the diaphragm 13 remains free to provide the proportional restoring force.

While the non-compliant backing means comprising the member 14, the pressure plate 26 and the contact 29 rigidly position the plug 9, means must be provided for maintaining a sealing pressure on the cell adequate to assure that sealing contact is maintaind between the diaphragms 12 and 13 and the ring 7 and between the plug 9 and the ring 7. This is accomplished by provision of the elastic ring gaskets 20 and 21. The gaskets 20 and 21 are compressed when the ring 25 is adjusted during initial assembly. Thereafter, stresses and positional changes resulting from thermal expansion of the various component parts are compensated for by elasticity of the gaskets 20 and 21.

It will also be noted that the spheroidal face of the contact 29 engages the pressure plate 26 at the center of the pressure plate, and the pressure plate is centered relative to the plug 9. Thus, backing pressure applied to the plug 9 is evenly distributed about the center of the plug, reducing the danger of plug breakage resulting from stresses due to thermal expansion of the component parts of the instrument.

While a preferred form of the backing member 14 has been illustrated, many other equivalent forms are obviously possible. For example, in Fig. 6c there is illustrated a composite backing member 14a having crossed bars 30, the edges 17a of which form an interrupted planar supporting surface for engagement with the electrode 11. Each bar 30 is provided with an extension 18a to engage the diaphragm 13 adjacent the ring 7. The spaces between the bars 30 provide for fluid flow in the cell.

The backing member 14 also provides the desired result of maintaining the permeable electrode 11 in intimate contact with the face of plug 9. While use of the permeable sheet electrode is highly advantageous, it should be noted that other types of electrodes can be employed in combination with the backing member 14. Further it is possible to employ the backing member itself as the electrode, the supporting face of the backing member then preferably being maintained in direct intimate contact with the face of the plug. In this connection, it should be noted that a backing member can be employed in each chamber of the cell.

It will be noted that the diaphragms 12 and 13 form the contacts for the electrokinetic cell, the diaphragm 12 being connected to the conductive housing 5, and the diaphragm 13 to the contact member 29. The contact member 29 is provided with a stem 31 extending freely through a bore in the member 27 and connected to one conductor of a shielded cable 32. The member 27, and thus the housing 5, is connected to the other conductor of the cable. For temperature compensation, a negative temperature coefficient thermistor 33 situated within the housing 5 is connected between the stem 31 and the member 27, and is thus electrically connected between the electrodes 10 and 11. The cable 32 leads through a bushing 34 and, in this embodiment of the invention, the housing 5 can be sealed by a screw cap 35.

The metal parts of the electrokinetic cell in contact with the liquid may be of any metal such as aluminum platinum, platinized platinum, gold or silver which is inert to the electrokinetic liquid employed. The permeable electrodes 10 and 11 may be of perforated metal, wire fabric, sintered metal or evaporated metal film, and should cover as much as possible of the faces of the plug 9 to minimize output impedance and reduce polarization effects when appreciable currents flow. When using acetonitrile, the electrodes and all metallic parts in contact with the liquid must be of aluminum, tin, or other metals which do not form soluble ions in acetonitrile. Platinum, gold, and silver contaminate acetonitrile, changing its conductivity appreciably in a matter of hours.

The plug 9 is maintained in tight sealing engagement with the shoulder 8 of the ring 7 to prevent liquid flow past the periphery of the plug. When the electrokinetic liquid is acetonitrile, the porous plug 9 can be sealed to the ring 7 by means of a micro-crystalline hydrocarbon wax, the wax being painted while warm around the periphery of the plug and on the shoulder 8. The plug is then pressed into place and the excess wax removed. Similarly, it is desirable to seal the diaphragms to the ring by means of microcrystalline hydrocarbon wax. When other electrokinetic liquids are employed which dissolve hydrocarbon wax, careful selection of a sealing compound insoluble in liquid must be made to avoid progressive contamination of the liquid.

In operation, pressure acting on front diaphragm 12 forces the electrokinetic liquid contained in the forward portion of the cell through the porous plug 9, causing an electrokinetic current to flow and a streaming potential to develop across the porous plug. The streaming potential is sensed by the electrodes 10 and 11 and connected, as described to the contact member 29, and the shielded cable 32. Variations of streaming potential with ambient temperature are compensated by the NTC resistor 33 which varies the resistive shunt load as a function of temperature. The viscous resistance pressure exerted by the porous plug 9 is much greater than the compliant forces of the diaphragms 12 and 13 or the reaction forces of the liquid mass except at very high or very low frequencies. Alternating or transient pressures can thus be accurately measured by observing or recording the potentials in the shielded cable.

It can be seen that the novel arrangement shown in Fig. 6 provides for a flush diaphragm 12 and combines the functions of supplying intimate electrical contact with non-compliant balanced clamping of the rear permeable electrode 11. It will be evident that the backing plug 14 in combination with the rear permeable electrode 11 may be replaced by a solid backing means or a disk of porous metal and a solid clamping ring similar to inner ring 19 without departing from the spirit of my invention or the functions described. It may also be seen that the beveled surfaces used to provde a flush diaphragm may equally well be flat surfaces when it is not necessary to have a flush mounting for the front diaphragm. The outer rims of the backing plug 14 and inner ring 19 in addition to the other functions described serve to support the outer ring and prevent crushing when very large sealing pressures are used.

Suitable backing means such as that provided by backing member 14 and permeable metal electrode 11 on one or both sides of the porous plug as shown in Fig. 6 makes it possible to achieve increased power output and lower output impedance by the use of thin discs or membranes. It has been shown that the open circuit sensitivity H/P is independent of the plug thickness $t$. The electrokinetic cell can, at mid-band frequencies, be considered as a voltage source H in series with an internal impedance, $R_d$, since $R_v$ is much greater than $R_d$. If an ideally matched load impedance is used for maximum power output where $R_L=R_d$, the power supplied to the load impedance is simply:

$$\text{Power}=\frac{1}{4}\left(\frac{H}{P}\right)^2\frac{KAF}{t}P^2$$

Since H/P is independent of the thickness of the porous plug, $t$, it is evident that the power output is increased as $t$ is decreased. It is, therefore, practicable where using suitable backing means, such as that shown in Fig. 6, to employ discs even thinner than 1.5 mm.

For very low pressure applications such as microphones where breakage of the porous plug is not a problem the same power and impedance advantages may be achieved without a rigid backing means. Very thin discs may be used in combination with unbacked permeable metal electrodes.

Figure 7A:
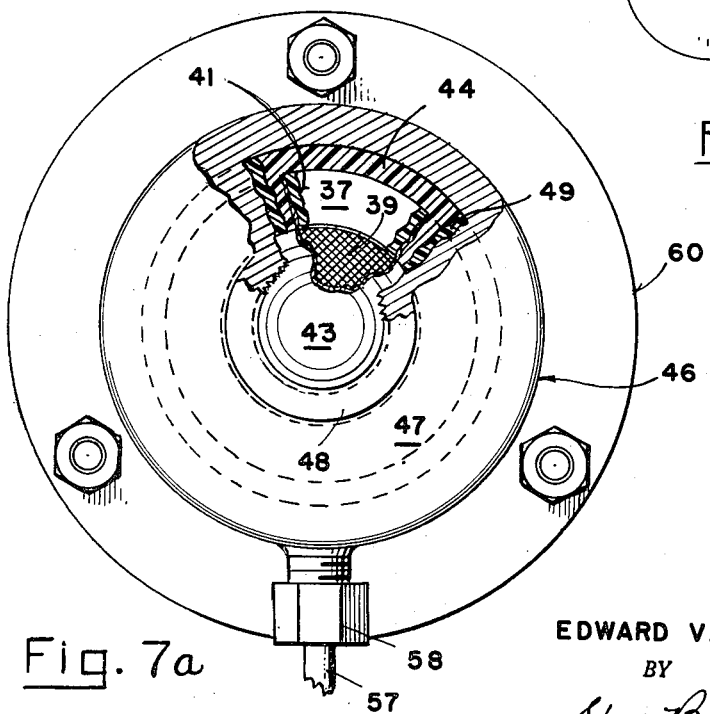
Fig. 7a is an end elevation of the instrument of Fig. 7, parts thereof being cut away to show the interior of the instrument.
Figure 7:
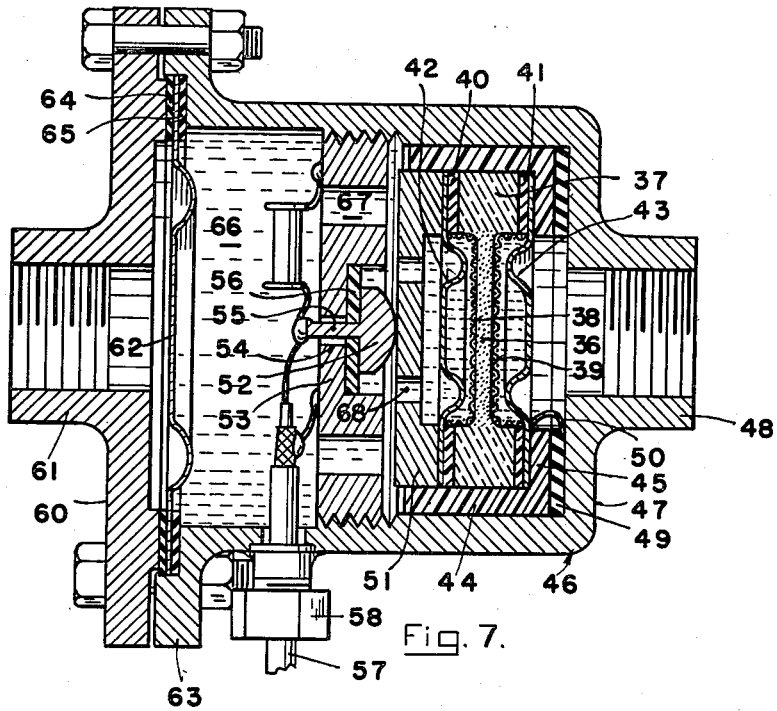
Fig. 7 is an axial sectional view of an electrokinetic pressure measuring instrument constructed in accordance with the invention and particularly suited for measuring low differential and gauge pressures in liquids and corrosive or humid gases.

Fig. 7 illustrates another embodiment of the invention suitable for measuring differential pressure in conducting liquids or corrosive humid gases. This instrument may also be employed for measuring transient or varying gage pressures by applying pressure to only one end of the instrument.

In this embodiment, the EK cell comprises a porous plug 36, consisting of a disc of ultra-fine porosity fritted glass, fused about its periphery to a ring 37 of glass. The disc 36 divides the interior of the ring into two shallow cup-like chambers, and these chambers are entirely lined with self-supporting porous sheet electrodes 38 and 39, of fine mesh aluminum wire fabric. Ring gaskets 40 and 41, preferably of polytetrafluoroethylene, are provided at each end of the ring 37, and the two chambers of the cell are closed by flexible metal diaphragms 42 and 43, as shown, the cell being filled with an electrokinetic fluid, preferably acetonitrile. The entire cell is disposed in an insulating ring 44, preferably of polytetrafluoroethylene, the ring having an end flange 45 engaging the outer surface of the diaphragm 43 adjacent the periphery thereof. The ring 44 is enclosed by a metal housing 46 having an end wall 47 with a threaded connector 48 for engagement with a pipe or other fluid conduit. The ring 44 fits snugly against the inner wall of the housing 46 and the flange 45 of the ring is separated from the end wall 47 of the housing by an elastic gasket 49 of rubberlike material, the diaphragm 43 being connected to the housing 46 by a strip of metal foil 50.

The end wall 47 of the housing serves to position the ring 44 and the cell, the cell, and therefore the ring 44, being urged toward the end wall 47 by pressure applying means comprising the combination of a pressure plate 51, an electrical contact button 52 having a generally spheroidal face in contact with the pressure plate, and an exteriorly threaded pressure applying member 53 threaded into interior threads on the casing 46 as shown. As in the structure shown in Fig. 6, the member 53 is provided with a central bore 54, and the contact member 52 has a stem 55 extending through this bore out of contact with the member 53. The contact button 52 is insulated from the member 53 by an insulating washer 56. Thus, rotation of the member 53 in one direction relative to the housing 46 urges the pressure plate 51 against the diaphragm 42, and thus presses the electrokinetic cell and its enclosing ring 44 toward the end wall 47. The central area of the pressure plate 51 is cut away or recessed, as shown, to provide free working space for the diaphragm 42, so that the pressure plate engages the diaphragm only in an annular area opposite the ring gasket 40.

It will be noted that the electrodes 38 and 39 overlie the inner wall of the ring 37 and extend across the gaskets 40 and 41 into contact with the metal diaphragms 42 and 43, respectively. Thus the circuit for the cell is from electrode 38, on the one hand, through diaphragm 42, pressure plate 51 and contact 52, and from electrode 39, on the other hand, through diaphragm 43, strip 50 and housing 46. A two conductor shielded cable 57, entering the housing 46 via a sealing bushing 58, has one of its conductors connected to the contact member 52, and thus to the electrode 38, and the other connected to the member 53, thus through the housing to the electrode 39. Thus, a suitable electroresponsive indicator or recorder can be connected across the electrodes 38 and 39 by the cable 57. Temperature compensation is provided by a thermistor 59 located within the housing 46 and connected between the contact stem 55 and the member 53.

The end of the housing opposite the cell is closed by a plate 60 having a threaded connector 61, an auxiliary diaphragm 62 being clamped between the plate 60 and a flange 63 on the housing, suitable sealing gaskets 64 and 65 being provided as shown. The diaphragm 62 seals off a chamber 66, which chamber is filled with a non-conductive hydrocarbon oil or similar non-corrosive liquid. It will be noted that the members 51 and 53 are provided with bores 68 and 67, respectively, allowing free passage of the last mentioned liquid, so that movement of the diaphragm 62 is imparted, via the liquid, to the diaphragm 42.

The flow of liquid in the electrokinetic cell, and thus the streaming potential, is governed by the differential pressure across the opposite ports or connectors 48 and 61. The electrical circuits of the cell, and the component parts, are thus insulated electrically and physically from the liquid or gas exhibiting the pressure variations being measured. Where desirable, an isolation chamber, as at 66, may be provided on each side of the cell. The added mass of the non-conducting liquid in the chamber 66 will lower the frequency response of the instrument. When gage pressures only are being measured, or when differential pressures are being measured in dry air or inert gases, the auxiliary diaphragm 62 and the liquid in chambers 66 may be omitted to improve the frequency response at higher frequencies.

Figures 8, 9, 10:
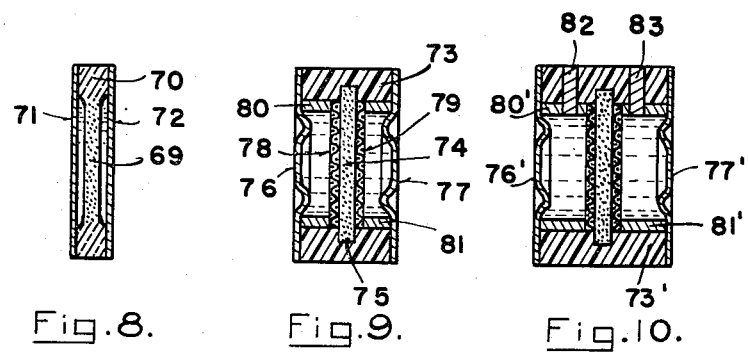
Fig. 8 is an axial sectional view of a modified form of electrokinetic cell useful in the instrument of Fig. 7.
Fig. 9 is an axial sectional view of another modified form of electrokinetic cell constructed in accordance with the invention.
Fig. 10 is an axial sectional view of a further modified form of electrokinetic cell constructed in accordance with the invention.

Fig. 8 shows an EK cell useful in structures such as that shown in Fig. 7, and particularly adaptable for use in hydrophones and microphones. Here, a porous disc 69 of fritted glass or porcelain is fused to an inorganic insulating ring 70, so as to form two shallow cup-like chambers. Flat metal diaphragms 71 and 72 are sealed directly to the ring, as by means of microcrystalline hydrocarbon wax, and the ring is filled with an electrokinetic liquid such as acetonitrile. The diaphragms 71 and 72 form the electrodes of the cell. Such a structure is useful where the diaphragm travel is very small or substantially negligible, and is limited to such applications because, as has been pointed out, it is necessary to have the electrodes at least closely adjacent to the faces of the porous plug. As a practical standard, I find that the diaphragm-electrodes 71 and 72 should be spaced from the plug 69 at least no further than the thickness of the plug, and that the plug should be a disc on the order of 1.5 mm., or less, in thickness.

Fig. 9 illustrates another cell structure which may be employed in the instrument of Fig. 7. Here, the outer ring 73 is of polytetrafluoroethylene or the like, and the porous disc 74 is sealed into an internal transverse groove 75 in the ring. The ends of the ring 73 are closed by conductive diaphragms 76 and 77 and the ring is filled with an electrokinetic liquid. Permeable sheet electrodes 78 and 79 overlie the faces of the disc 74 and are held in place, and electrically connected to the diaphragms 76 and 77, respectively, by metal rings 80 and 81. This cell is designed for pressure sealing as in Fig. 7; that is, the diaphragms 76 and 77 are held in sealing engagement with the end faces of the ring by pressure. As seen in Fig. 10, such a cell may be made as a self-contained sealed unit. The diaphragms 76' and 77' are sealed or bonded to the end faces of the ring 73' before filling. Holes are drilled through the outer ring 73' and the metal rings 80' and 81', the cell is completely filled with electrokinetic liquid, and the holes are plugged by sealing pins 82 and 83, as shown.

Figure 11:
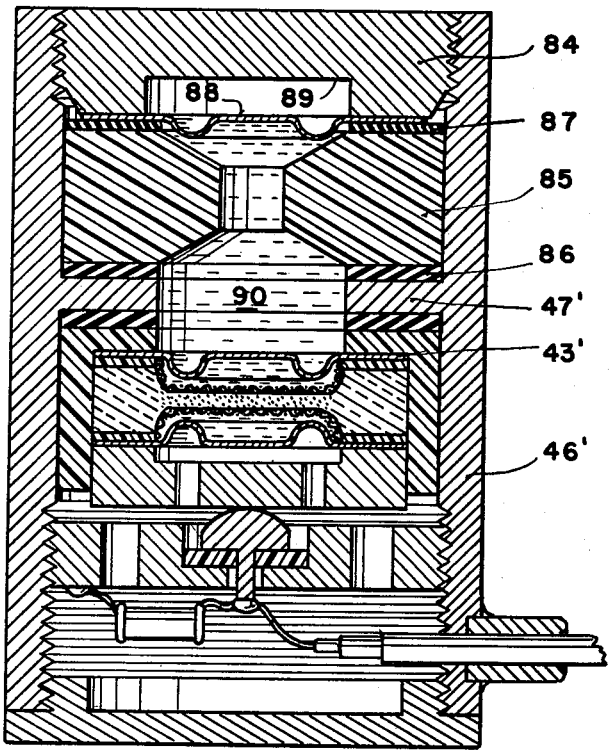
Fig. 11 is an axial sectional view of an electrokinetic measuring instrument constructed in accordance with the invention and embodying an auxiliary heavy liquid chamber to increase linear acceleration sensitivity.

In Fig. 11, an arrangement is shown for measuring alternating and transient linear accelerations. The embodiments of the invention previously described herein may be used for measuring case acceleration, since when the case of the instrument is accelerated a differential pressure appears across the porous plug, this pressure being equal to the product of the density of the electrokinetic liquid, the length of the liquid column and the magnitude of the acceleration. However, in pressure measuring devices such as are shown in Figs. 6 and 7, acceleration sensitivity is minimized because the liquid column is relatively short and the density of the liquid is relatively low.

In the apparatus of Fig. 11, the structure is similar to that shown in Fig. 7 except that the housing 46' is extended beyond the end wall 47' to provide a chamber closed by threaded plug 84. Within this chamber there is positioned a restrictor ring 85, held substantially rigidly in place by means of gaskets 86 and 87 and the plug 84. Clamped between the plug 84 and the gasket 87 is a flexible diaphragm 88, the plug 84 being recessed as shown at 89 to provide free working space for the diaphragm. The entire space 90 between the diaphragm 88 and the diaphragm 43' of the electrokinetic cell is filled with a heavy liquid, such as mercury.

The instrument is suitable for acceleration and vibration measurements at large and small amplitudes over a wide range of frequencies. High sensitivity is achieved by the heavy liquid in space 90, this arrangement providing, upon acceleration of the case, a relatively large differential pressure across the porous plug of the cell without necessitating a long liquid column.

In the embodiment shown in Fig. 6, backing pressure for the cell is supplied via the pressure plate 26, and the gaskets 20 and 21 provide the elastic support necessary to maintain a constant seal between the cell parts. In the embodiments shown in Figs. 7 and 11, it is unnecessary to maintain sealing pressure between the porous disc and the outer ring of the EK cell, since the disc is fused about its periphery to the ring, but it is necessary to maintain sealing pressure to maintain the diaphragms of the cell against the ends of the ring. Such pressure is afforded by the action of the pressure applying members 51—53 acting against the elasticity of ring gasket 49, Fig. 7. The same is true of Fig. 11.

I claim:

1. In an electrokinetic cell, the combination of an enclosing member, a porous plug mounted within said member and dividing the interior thereof into two chambers, and a backing member disposed in one of said chambers to provide mechanical support for said plug at a point removed from the periphery thereof, said backing member allowing liquid flow in said one chamber.

2. In an electrokinetic cell, the combination of an enclosing member, a thin porous disc disposed within said member to divide the interior thereof into two chambers, and a backing member disposed in one of said chambers to support said disc, said backing member including an interrupted planar disc supporting face and a liquid passageway communicating with said disc, the interrupted disc supporting face of said backing member providing support for said plug at uniformly distributed points on said plug removed from the periphery thereof.

3. In an electrokinetic cell, the combination of an enclosing member, a thin porous disc disposed within said member to divide the interior thereof into two chambers, a permeable sheet electrode overlying substantially the entire exposed surface of one face of said disc, and a backing member disposed within said enclosing member in contact with said electrode to maintain said electrode in intimate contact with said disc and to support said disc, said backing member contacting said electrode at uniformly distributed points removed from the periphery of said plug and including a liquid passageway communicating with said disc through said electrode.

4. In an electrokinetic cell, the combination of an enclosing member, an inorganic insulating disc of ultra-fine porosity and having a thickness of less than 1.5 mm. disposed within said enclosing member and dividing the interior thereof into two chambers, a permeable electrode of metal fabric overlying one face of said disc, and a backing member disposed within said enclosing member in contact with said electrode at points substantially removed from the periphery of said disc to maintain said electrode in intimate contact with said disc and to support said disc.

5. The combination defined in claim 4, wherein said disc has an average pore size of 1.2 microns.

6. In an elctrokinetic cell, the combination of a ring having a transverse internal shoulder, a porous plug disposed within said ring and seated against said shoulder to divide the interior of said ring into two chambers, and a backing member disposed within said ring on the side of said plug opposite said shoulder to back up said plug and to hold said plug seated against said shoulder, said backing member being provided with an interrupted planar plug supporting face providing support for said plug at points substantially removed from the periphery thereof.

7. In an electrokinetic cell, the combination of a ring of insulating material; a porous disc sealed within said ring to divide the interior thereof into two chambers, said chamber being filled with an electrokinetic liquid; a permeable metal electrode disposed in each of said chambers, each of said electrodes overying substantially the entire adjacent exposed face of said disc; an electrically conductive flexible metal diaphragm secured across each end of said ring to seal said chambers and form contact members for the cell; a backing member of electrically conductive material disposed in one of said chambers, said backing member having an interrupted planar face in contact with one of said electrodes and its opposite face including portions in contact with one of said diaphragms at the periphery thereof so that said backing member connects said last mentioned electrode and diaphragm both mechanically and electrically; and an electrically conductive element in the other of said chambers connecting the other of said electrodes electrically to the other of said diaphragms.

8. In combination in an electrokinetic instrument, an electrokinetic cell comprising a ring; a porous plug disposed within said ring to divide the interior thereof into two chambers; a diaphragm closing one of said chambers, said chambers being filled with an electrokinetic liquid; a backing member disposed between said plug and said diaphragm, said backing member having on one side an annular face engaging said diaphragm and on the other side a plug supporting face including a plurality of plug supporting portions spaced apart and lying in a single plane, said backing member being provided with at least one liquid conducting bore communicating between said faces; a housing carrying said electrokinetic cell, and means associated with said housing for supplying support for said backing member through said diaphragm.

9. In combination in an electrokinetic instrument, an electrokinetic cell comprising a ring; a porous plug disposed within said ring to divide the interior thereof into two chambers; a diaphragm closing one of said chambers, said chambers being filled with an electrokinetic liquid; a backing member disposed between said plug and said diaphragm, said backing member having on one side an interrupted planar plug supporting face and on the other side a diaphragm contacting face engaging said diaphragm only adjacent said ring, said backing member being provided with a bore providing for liquid flow between said plug and said diaphragm; a housing carrying said electrokinetic cell, and means associated with said housing for supplying support for said backing member through said diaphragm.

10. In combination in an electrokinetic instrument, a housing including an internal transverse shoulder; an electrokinetic cell comprising an enclosure, a porous plug disposed within said enclosure to divide the interior thereof into two chambers, said chambers being filled with an electrokinetic liquid, and a flexible diaphragm disposed across each end of said enclosure to seal said chambers, said cell being disposed within said housing adjacent said shoulder; means associated with said housing for applying pressure against said cell to seat the same against said shoulder, said means providing for free liquid flow within said housing; and a flexible diaphragm sealing the interior of said housing opposite said shoulder to provide a chamber situated on one side of said cell, said chamber being filled with liquid.

11. In combination in an electrokinetic instrument, a housing including an internal bore having a transverse internal shoulder; an electrokinetic cell comprising a ring, a porous plug disposed within said ring to divide the interior thereof into two chambers, said chambers being filled with an electrokinetic liquid, and flexible diaphragms secured across the ends of said ring to seal said chambers, said cell being situated within said bore adjacent said shoulder; a flexible gasket between said cell and said shoulder; means associated with said housing for applying pressure against said cell to seat the same against said gasket, said means providing for free liquid flow within said bore; and a flexible diaphragm sealing said bore at a point spaced from said cell on the side opposite said shoulder to provide a chamber defined by said bore, said last mentioned diaphragm and one diaphragm of said cell, said chamber being filled with a liquid.

12. An electrokinetic cell comprising a microporous disc on the order of 1.5 mm. in thickness, a ring of insulating material surrounding said disc and sealed to the periphery thereof, said disc and ring defining two shallow chambers, and an electrically conductive diaphragm sealed across each end of said ring to close said chambers, said chambers being filled with an electrokinetic liquid and said diaphragms constituting the electrodes of said cell.

13. An electrokinetic cell comprising a thin disc of microporous inorganic insulating material, a ring of insulating material fused to the periphery of said disc, said disc and ring defining two shallow chambers, and an electrically conductive diaphragm sealed across each end of said ring to close said chamber, said chambers being filled with an electrokinetic liquid and said diaphragms constituting the electrodes of said cell.

14. An electrokinetic cell comprising a microporous disc on the order of 1.5 mm. in thickness, a ring of insulating material sealed to the periphery of said disc, said disc dividing the interior of said ring into two shallow chambers, and a flat electrically conductive diaphragm sealed across each end of said ring to close said chambers, said chambers being filled with an electrokinetic liquid and said diaphragms constituting the electrodes of said cell, the spacing between said diaphragms and said disc being less than the thickness of said disc.

15. An electrokinetic cell comprising an enclosing member, a porous plug disposed in said enclosing member to divide the interior thereof into two chambers, said chambers being filled with an electrokinetic liquid, and a flexible diaphragm disposed across each end of said enclosing member to seal said chambers, the damping ratio of said cell being expressible by the equation $$\frac{C}{C_c} = \frac{1}{2}\sqrt{\frac{T_s}{T_m}}$$

where C is the damping coefficient, $C_c$ is the value of damping for response borderline between aperiodic and periodic response, $T_s$ is the elastance time constant and $T_m$ is the mass time constant, the ratio $T_m:T_s$ for said cell being at least 1:10,000.

16. In combination in a high sensitivity electrokinetic instrument for measuring linear accelerations, an electrokinetic cell comprising an insulating enclosure, a porous plug disposed within said enclosure to divide the interior thereof into two chambers, said chambers being filled with an electrokinetic liquid, a flexible metal diaphragm disposed across each end of said enclosure to close said chambers, and electrodes located one in each of said chambers and each electrically connected to one of said diaphragms; a housing including a transverse internal shoulder, said cell being disposed within said housing adjacent said shoulder; means associated with said housing for urging said cell toward said shoulder to fix said cell within said housing and maintain sealing pressure on said diaphragms, and a flexible diaphragm sealing the interior of said housing and spaced from said cell, the space within said housing between said diaphragm and said cell being filled with a liquid of relatively high density.

17. In combination in an electrokinetic instrument, a housing including a transverse internal shoulder; an electrokinetic cell comprising an enclosing member, a porous plug disposed within said enclosing member to divide the interior thereof into two chambers, said chambers being filled with an electrokinetic liquid, and flexible diaphragms disposed across the ends of said enclosing member to seal said chambers, said cell being situated within said housing adjacent said shoulder; a resilient gasket between said cell and said shoulder, and means associated with said housing for applying pressure to said cell to seat the same against said gasket.

18. In combination in an electrokinetic instrument, an electrokinetic cell comprising an enclosure, a porous plug disposed within said enclosure to divide the interior thereof into two chambers, said chambers being filled with an electrokinetic liquid, a diaphragm closing one of said chambers, and a rigid member disposed within said one chamber and mechanically bridging the space between said diaphragm and said plug, said rigid member allowing liquid flow between said plug and said diaphragm, a housing carrying said cell, and means carried by said housing outside of said cell and engaging said diaphragm opposite said rigid member for applying a clamping force to said cell through said diaphragm, rigid member and plug.

19. In combination in an electrokinetic instrument, a housing; an electrokinetic cell disposed in said housing and comprising an insulating member having a bore, a porous plug mounted in said bore and dividing the same into two chambers, said chamber being filled with an electrokinetic liquid, a diaphragm positioned across one end of said insulating member to close one of said chambers, and a rigid member disposed in said one chamber and mechanically bridging the space between said diaphragm and plug; cell supporting means carried by said housing and engaging said cell on the side opposite said diaphragm, and means carried by said housing outside of said cell and engaging said diaphragm opposite said rigid member to apply to said cell a force urging the same toward said cell supporting means.

20. In combination in an electrokinetic instrument, a housing having an interior shoulder; an electrokinetic cell comprising an insulating member having a bore, a porous plug disposed in said bore to divide the same into two chambers, said chambers being filled with an electrokinetic liquid, a diaphragm disposed across one end of said insulating member to close one of said chambers, and a rigid member located within said one chamber and mechanically bridging the space between said plug and said diaphragm, said rigid member allowing liquid flow between said plug and said diaphragm, said cell being disposed within said housing with the end of said insulating member closed by said diaphragm facing away from said shoulder; a pressure plate disposed in contact with said diaphragm on the outside of said cell only at points opposite said rigid member, and means interconnecting said pressure plate and said housing to apply pressure to said cell to force the cell toward said shoulder.

21. In combination in an electrokinetic instrument, a housing having an internal shoulder; an electrokinetic cell comprising an insulating member having a bore, a porous plug disposed in said bore and dividing the same into two chambers, said chambers being filled with an electrokinetic liquid, a diaphragm disposed across each end of said bore with the marginal portion of each diaphragm overlapping the body of said insulating member, and a rigid member disposed in one of said chambers and mechanically bridging the space between said plug and the one of said diaphragms closing said one chamber, said cell being disposed within said housing with said one diaphragm facing away from said shoulder; means carried by said housing and engaging the marginal portion of said one diaphragm to force said cell toward said shoulder and thus apply sealing pressure to said diaphragms, and means carried by said housing and engaging said one diaphragm only at points opposite said rigid member to provide additional support for said cell and said plug.

22. In an electrokinetic instrument, the combination of a housing; an electrokinetic cell disposed in said housing and comprising an enclosing member, a porous plug mounted within said member and dividing the interior thereof into two chambers, said chambers being filled with an electrokinetic liquid, and electrodes arranged one in contact with the liquid in each of said chambers; and clamping means in said housing comprising a pair of mutually opposed members between which said cell is held, one of said members rigidly engaging said cell at one side of said plug to provide a non-yielding backing for said cell, and resilient means interposed between the other of said members and said cell to provide a support for said cell at the other side of said plug capable of yielding to accommodate dimensional changes due to temperature variations.

23. In an electrokinetic instrument, the combination of a housing; an electrokinetic cell mounted in said housing and comprising an insulating member having a bore, a porous plug mounted within said bore and dividing the same into two chambers, and electrodes arranged one in contact with the liquid in each of said chambers, said chambers being filled with an electrokinetic liquid; rigid means carried by said housing and engaging said cell on one side of said plug to provide a substantially non-compliant support for said cell, and means carried by said housing and yieldingly engaging said cell on the opposite side of said plug to provide compliant support for said cell in opposition to said rigid means.

24. In an electrokinetic instrument, the combination of a housing; an electrokinetic cell disposed within said housing and comprising an insulating member having a bore, a porous insulating plug mounted within said bore and dividing the same into two chambers, and diaphragms positioned one across each end of said insulating member to close said chambers, said chambers being filled with an electrokinetic liquid; mounting means carried by said housing and arranged in pressure contact with each side of said cell at the marginal edge portions of said diaphragms to position said cell with respect to said housing and to apply sealing pressure to said diaphragms, and conductive means forming an electrical circuit to the liquid in each chamber of said cell.

25. In an electrokinetic instrument, the combination of a housing; an electrokinetic cell mounted in said housing and comprising an insulating member having a bore, a porous plug mounted within said bore and dividing the interior thereof into two chambers, and diaphragms positioned one across each end of said insulating member to close said chambers, said chambers being filled with an electrokinetic liquid; clamping means carried by said housing at one side of said cell and rigidly engaging one of said diaphragms at the edge portion thereof to provide a substantially non-compliant support for said cell; other clamping means carried by said housing at the other side of said cell and engaging the other of said diaphragms at the edge portion thereof to oppose said first mentioned clamping means, and means associated with said housing for urging said two clamping means together to exert a clamping force on cell, thereby securing said cell in said housing and applying sealing pressure to said diaphragms.

26. In an electrokinetic instrument, the combination of an electrically conductive housing; an electrokinetic cell mounted in said housing and comprising an insulating member having a bore, a porous insulating plug mounted within said bore and dividing the same into two chambers, and electrically conductive diaphragms positioned one across each end of said insulating member to close said chambers and form the contacts for said cell, said chambers being filled with an electrokinetic liquid; and mounting means carried by said housing and arranged in pressure contact with each side of said cell at the marginal edge portions of said diaphragms to position said cell with respect to said housing and to apply sealing pressure to said diaphragms, said mounting means including separate electrically conductive members each in electrical contact with a different one of said diaphragms, one of said conductive members being insulated from said housing and the other being in electrical contact therewith.

27. In an electrokinetic instrument, the combination of a housing; an electrokinetic cell disposed in said housing and comprising an insulating member having a bore, a porous plug mounted in said bore and dividing the same into two chambers, and a diaphragm positioned across one end of said insulating member to close one of said chambers, said chambers being filled with an electrokinetic liquid; cell supporting means carried by said housing and engaging said cell on the side opposite said diaphragm; a pressure plate engaging said diaphragm only at its marginal edge portion to apply sealing pressure to said diaphragm and to force said cell toward said cell supporting means, and means carried by said housing and contacting said pressure plate at the center thereof to apply clamping pressure to said plate.

28. In an electrokinetic instrument, the combination of an electrically conductive housing; an electrokinetic cell disposed in said housing and comprising an insulating member having a bore, a porous plug mounted in said bore and dividing the same into two chambers, and an electrically conductive diaphragm positioned across one end of said insulating member to close one of said chambers, said chambers being filled with an electrokinetic liquid; cell supporting means carried by said housing and engaging said cell on the side opposite said diaphragm; an electrically conductive pressure plate engaging said diaphragm to urge said cell toward said cell supporting means; a contact member engaging said pressure plate at the center thereof, and means associated with said housing for urging said contact member against said pressure plate to apply clamping pressure thereto, said contact member being electrically insulated from said housing.

29. In an electrokinetic instrument, the combination of a housing; an electrokinetic cell disposed in said housing and comprising an insulating member having a bore, a porous plug mounted in said bore and dividing the same into two chambers, and a diaphragm positioned across one end of said insulating member to close one of said chambers, said chambers being filled with an electrokinetic liquid and said cell including supporting means underlying an outer annular portion of said diaphragm; cell supporting means carried by said housing and engaging said cell on the side opposite said diaphragm; a pressure plate engaging said diaphragm on the outside of said cell only at said outer annular portion thereof, the central portion of said pressure plate being recessed to provide working space for said diaphragm; and means carried by said housing and contacting said pressure plate to force said plate against said diaphragm.

EDWARD V. HARDWAY, Jr.

References Cited in the file of this patent

UNITED STATES PATENTS

| Number | Name | Date |
| --- | --- | --- |
| 1,162,213 | Blum | Nov. 30, 1915 |

OTHER REFERENCES

"Wissenschaftliche Forschungsberiche" by Prausnitz et al., Steinkopff, Dresden 1931, page 86.